(12) United States Patent
Hecht

(10) Patent No.: US 8,251,087 B2
(45) Date of Patent: Aug. 28, 2012

(54) MODULAR FITTINGS AND ASSEMBLIES FOR FLUID SWITCHING

(75) Inventor: Thomas R. Hecht, Winters, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 969 days.

(21) Appl. No.: 12/046,401

(22) Filed: Mar. 11, 2008

(65) Prior Publication Data
US 2008/0224078 A1  Sep. 18, 2008

Related U.S. Application Data

(60) Provisional application No. 60/894,448, filed on Mar. 12, 2007.

(51) Int. Cl.
*F15B 13/00* (2006.01)
*F16L 37/56* (2006.01)

(52) U.S. Cl. .................... 137/271; 137/269; 137/594

(58) Field of Classification Search .............. 137/271, 137/884, 269, 594; 285/61, 124.1–124.5; 248/49, 65, 68.1, 74.1; 251/129.15, 148, 251/61; 222/129.4, 143
See application file for complete search history.

(56) References Cited

U.S. PATENT DOCUMENTS

| | | | |
|---|---|---|---|
| 4,114,241 A * | 9/1978 | Bisping | 403/188 |
| 4,821,925 A * | 4/1989 | Wiley et al. | 222/129.4 |
| 5,234,185 A * | 8/1993 | Hoffman et al. | 248/56 |
| 5,555,911 A * | 9/1996 | Fukano et al. | 137/625.69 |
| 5,860,676 A * | 1/1999 | Brzezicki et al. | 285/24 |
| 6,286,877 B1 * | 9/2001 | Mendoza et al. | 285/351 |
| 6,415,822 B1 * | 7/2002 | Hollingshead | 137/884 |
| 6,481,756 B1 * | 11/2002 | Field et al. | 285/124.1 |
| 6,712,027 B2 * | 3/2004 | Rocheleau | 122/235.15 |
| 6,763,848 B2 * | 7/2004 | Rondreux et al. | 137/269 |
| 6,775,593 B1 * | 8/2004 | Parker et al. | 700/282 |
| 7,213,618 B2 * | 5/2007 | Milburn et al. | 137/884 |
| 7,252,115 B2 * | 8/2007 | Miyazoe et al. | 137/625.64 |
| 7,370,674 B2 * | 5/2008 | Doyle | 137/884 |
| 7,806,294 B2 * | 10/2010 | Gatipon et al. | 222/1 |
| 2006/0027598 A1 * | 2/2006 | Ubidia et al. | 222/129.1 |
| 2007/0068587 A1 * | 3/2007 | Utterberg et al. | 137/872 |
| 2010/0036528 A1 * | 2/2010 | Minard et al. | 700/265 |

\* cited by examiner

*Primary Examiner* — John Rivell
*Assistant Examiner* — David Colon Morales
(74) *Attorney, Agent, or Firm* — Kilpatrick Townsend & Stockton LLP

(57) ABSTRACT

A modular fitting for use with a commercially-available fluid or pneumatic switch, such as solenoid valves. The modular fittings disclosed can be aggregated to form a resulting modular fitting assembly according to the number of fluid circuits desired. The modular fittings include one or more coupling features that provide the ability to couple adjacent modular fittings.

20 Claims, 8 Drawing Sheets

MODULAR FITTINGS AND ASSEMBLIES FOR FLUID SWITCHING

CROSS-REFERENCES TO RELATED APPLICATIONS

This application claims the benefit under 35 U.S.C. §119(e) of U.S. Provisional Patent Application No. 60/894,448, filed Mar. 12, 2007, the full disclosure of which is incorporated herein by reference.

BACKGROUND OF THE INVENTION

The present invention is related to beverage dispensers, and more particularly to a switching module for beverage dispensers.

A beverage dispensing system such as one commercially available from the assignee herein includes a flow path from a source of a beverage to a dispensing nozzle. In such a system, an operator can cause a mixed beverage to be drawn from its source or sources and be delivered to a cup or a glass. The flow path in such a dispensing system typically includes one or more switching elements that use a solenoid valve to control the flow of the beverage from its source to its destination. FIG. 1 shows a part of such a solenoid valve assembly 10. As shown in FIG. 1, such a solenoid valve assembly 10 may include a commercially available solenoid valve 12 that is fitted or screwed into a base 14. The base 14 is connected with an inlet conduit 16 and an outlet conduit 18 to deliver fluid to and from the solenoid valve 12. The base can also include flow passages. FIG. 2 shows an exploded view of the solenoid valve assembly 10 of FIG. 1.

A person skilled in the art can appreciate that a typical beverage dispensing system can have several such solenoid valve assemblies. As such, the beverage dispensing system may require custom-built components so as to accommodate the particular number of solenoid valve assemblies used in the beverage dispensing system. Such custom-built components need to be dimensioned and shaped to connect with other elements of the beverage dispensing circuit. A commercial beverage dispensing system can easily have ten or more different beverages, requiring at least 10 or more solenoid valves assemblies.

FIG. 3 shows a simplified diagram of a known solenoid-valve block assembly 20. The block assembly 20 shown can accommodate ten solenoid valves 12. Such a block assembly 20 can be machined from an acrylic block. As shown, the block assembly 20 has 10 inlet ports 24 that are connected with an associated solenoid valve 12 and 10 associated outlet ports (not shown). The upper surface 26 of the block assembly 20 is machined to receive the solenoid valves 12. O-rings are used to provide for appropriate sealing at the ports and at the solenoid receiving wells. As shown, the wells 28 are offset from one-another to allow for a more compact block assembly 20 construction. The solenoid block assembly 20 of FIG. 3 is advantageous as compared to the use of multiple solenoid valve assemblies 10 of FIG. 1 in that one block assembly 20 is used as a part of a switching assembly for ten solenoid valves 12. However, the block assembly 20 itself is a custom-machined part that is time consuming to produce. Furthermore, damage in any of the many inlet ports 24, outlet ports, or wells 28 could render the entire part unusable. In addition, the use of a block assembly 20 requires separately designed block assemblies for use in beverage systems having different numbers of fluid circuits, thereby causing additional expense.

Thus, there is therefore a need for a switching module that does not suffer from the above shortcomings.

BRIEF SUMMARY OF THE INVENTION

The present invention provides modular fittings for use in a beverage dispensing system. Modular fittings in accordance with the present invention are adapted to receive commercially-available fluid or pneumatic switches, such as a solenoid valve. Additionally, the modular fittings disclosed include coupling features adapted to couple the modular fitting with an adjacent modular fitting, thereby allowing selective aggregation of the modular fittings according to the number of fluid circuits desired. The modular fitting disclosed can be used, for example, as part of a beverage dispensing system having any number of individual beverage lines. For example, in a beverage dispensing system for six beverages, six of the modular fittings may be combined with six commercially-available solenoid valves as part of a switching assembly for the six beverages. Accordingly, the present invention provides increased flexibility in the formation of beverage dispensing systems, as well as decreased expense due to a number of factors, including reduced cost of fabrication and associated reductions in the number of unique parts.

Thus, in one aspect, the present invention provides a modular fitting for use with a solenoid valve to control the flow of a fluid in a beverage dispensing system. The modular fitting includes a first port for connection with a first fluid line and a second port for connection with a second fluid line. Disposed between the first and second ports is a solenoid base adapted to receive a solenoid valve and place a first side of a solenoid valve in fluid communication with the first port and place a second side of a solenoid valve in fluid communication with the second port. Additionally, the modular fitting may further include a coupling feature adapted to couple the modular fitting with a second modular fitting.

A modular fitting in accordance with the present invention may come in a variety of different embodiments. As non-exclusive examples of some of the variations possible, a modular fitting in accordance with the present invention may: a) be a unitary part; b) include a first conduit coupled with the first port and the solenoid base; c) include a second conduit coupled with the second port and the solenoid base; d) include a coupling feature that extends from a side of the modular fitting and is shaped to receive a complementary-shaped conduit of a second modular fitting; e) include a coupling feature that is offset from a coupling feature of a second modular fitting; f) include a coupling feature that is adapted to engage a complementary-shaped feature of a second modular fitting; g) have a solenoid base that is offset from a solenoid base of a second modular fitting; h) include first and/or second ports that are adapted to detachably couple with male or female fittings on first and/or second fluid lines; i) include first and/or second ports that include a recess to receive an o-ring seal and/or be adapted to receive a retaining pin; and/or j) have a solenoid base that includes a threaded well adapted to receive a solenoid valve.

In another aspect, the present invention provides a modular fitting assembly for use with solenoid control valves to control the flow of fluids in a beverage dispensing system. The modular fitting assembly includes a first and a second modular fitting, where the first modular fitting includes: a) a first port adapted to couple with a first fluid line; b) a second port adapted to couple with a second fluid line; c) a solenoid base adapted to receive a solenoid valve and to place a first side of a solenoid valve in fluid communication with the first port and to place a second side of a solenoid valve in fluid communication with the second port; and d) a coupling feature adapted to couple the first modular fitting with a second modular fitting. The second modular fitting of the assembly includes: a) a first port adapted to couple with a first fluid line; b) a second port adapted to couple with a second fluid line; and c) a solenoid base adapted to receive a solenoid valve and to place a first side of a solenoid valve in fluid communication with the first port and to place a second side of a solenoid valve in fluid communication with the second port.

The modular fitting assembly may also come in a variety of different embodiments. As non-exclusive examples of some of the variations possible, a modular fitting assembly in accordance with the present invention may: a) have a solenoid base of the first modular fitting that is offset from the solenoid base of the second modular fitting; b) have a second modular fitting that further includes a first conduit coupled with the first port and the solenoid base and a second conduit coupled with the second port and the solenoid base, and have a first modular fitting coupling feature that extends from a side of the first modular fitting and is shaped to receive a complementary-shaped conduit of the second modular fitting; c) have a second modular fitting that further includes a coupling feature that is offset from the coupling feature of the first modular fitting; d) have a first modular fitting coupling feature that is adapted to engage a complementary-shaped feature of the second modular fitting; e) have solenoid bases on the first and second modular fittings that are offset from each other; and/or f) have first and/or second ports of the first and/or second modular fittings that are further adapted to couple with fluid lines using one or more retaining pins.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

DETAILED DESCRIPTION OF THE INVENTION

Embodiments of the present invention relate generally to beverage dispensing systems and more particularly to beverage dispensing system components that interface with solenoid valves used to control the flow of fluids in a beverage dispensing system. The embodiments of the present invention described herein provides modular fittings that can be selectively aggregated to form a resulting modular fitting assembly having a desired number of fluid switching circuits.

Embodiments of the present invention enable the creation of specialized, machined or molded cooperating components (fittings) that are configured to couple with a commercially available solenoid valve so as to provide fluid flow control between the ports of the modular fitting. For example, in illustrated embodiments, a modular fitting in accordance with the present invention includes a threaded well for coupling with a solenoid valve having a threaded male portion. The present invention may also be embodied in a unitary part, as well as be embodied in a built-up assembly of separate components. Embodiments of the present invention may include one or more interconnecting features or devices adapted to provide coupling with adjacent modular fittings where more than one fluid circuit is desired. For example, a modular fitting in accordance with the present invention can include a coupling feature that is adapted to interface with a portion of an adjacent modular fitting. The modular fitting in accordance with the embodiments of the present invention can be used to integrate one or more solenoid valves into a beverage dispensing system so as to provide flow control.

Figure 1:
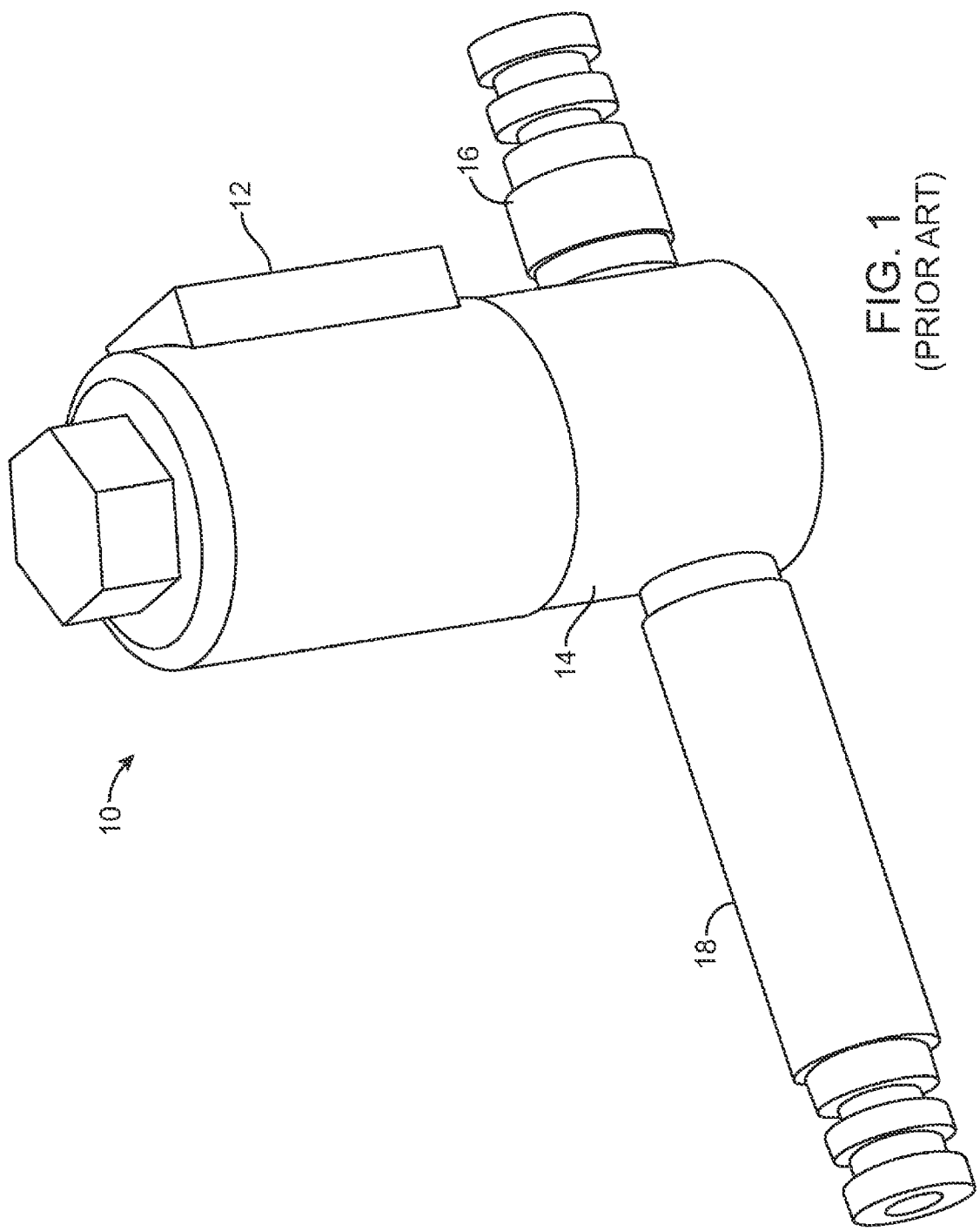
FIG. 1 is a simplified drawing of a known solenoid-valve assembly.
Figure 2:
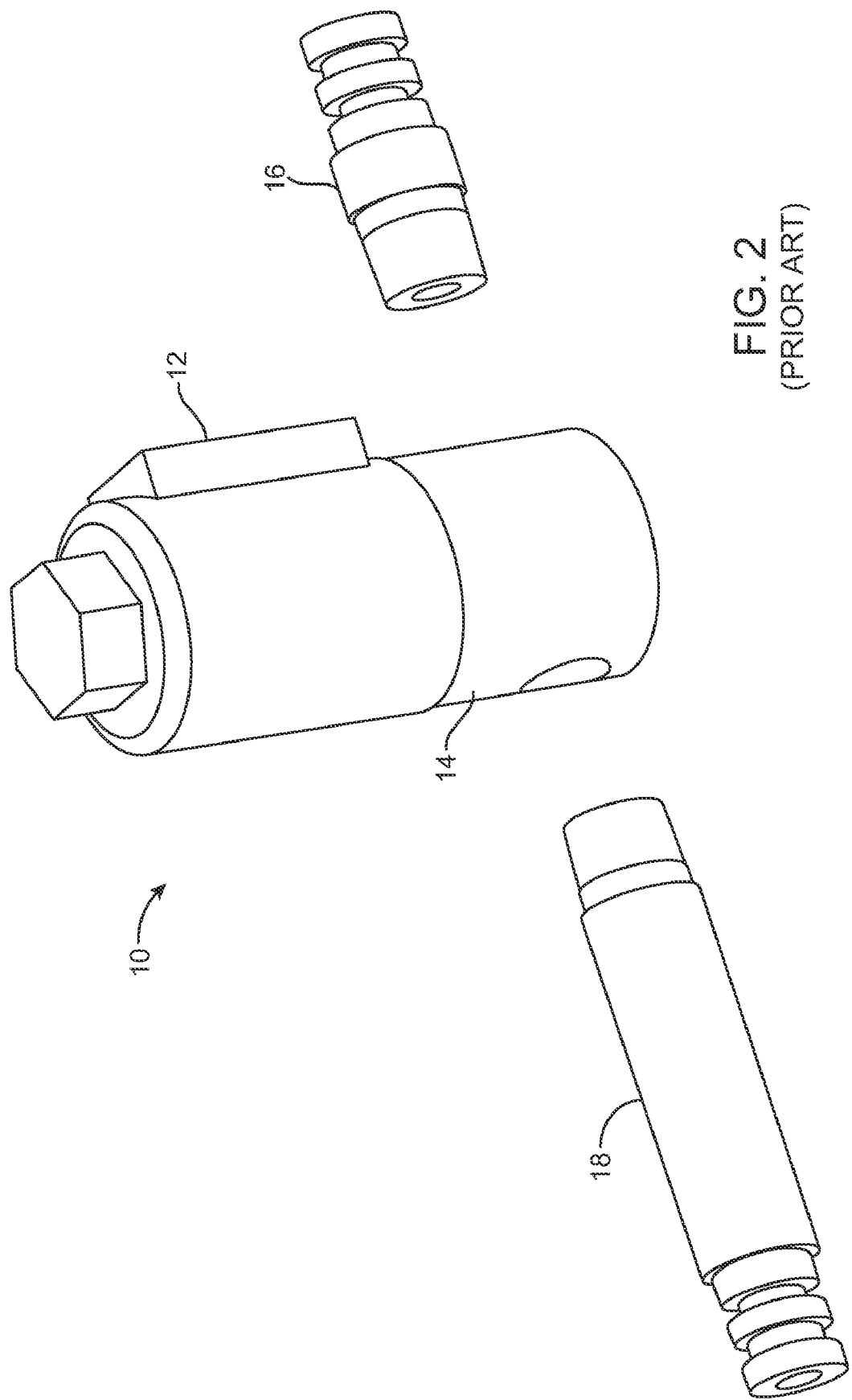
FIG. 2 is an exploded view diagram corresponding to the solenoid-valve assembly of FIG. 1.
Figure 3:
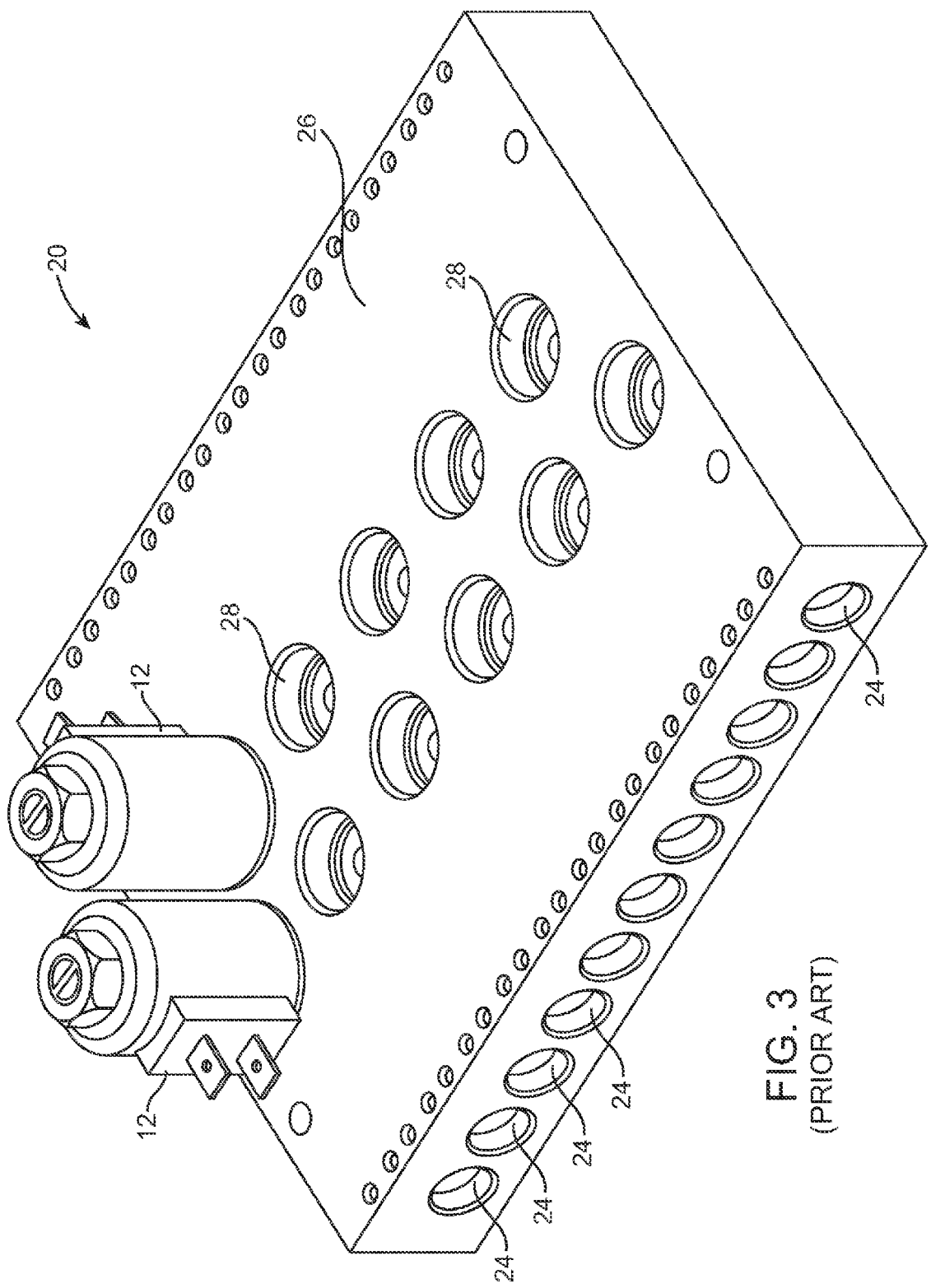
FIG. 3 is a simplified diagram of a known solenoid-valve block assembly.
Figure 4:
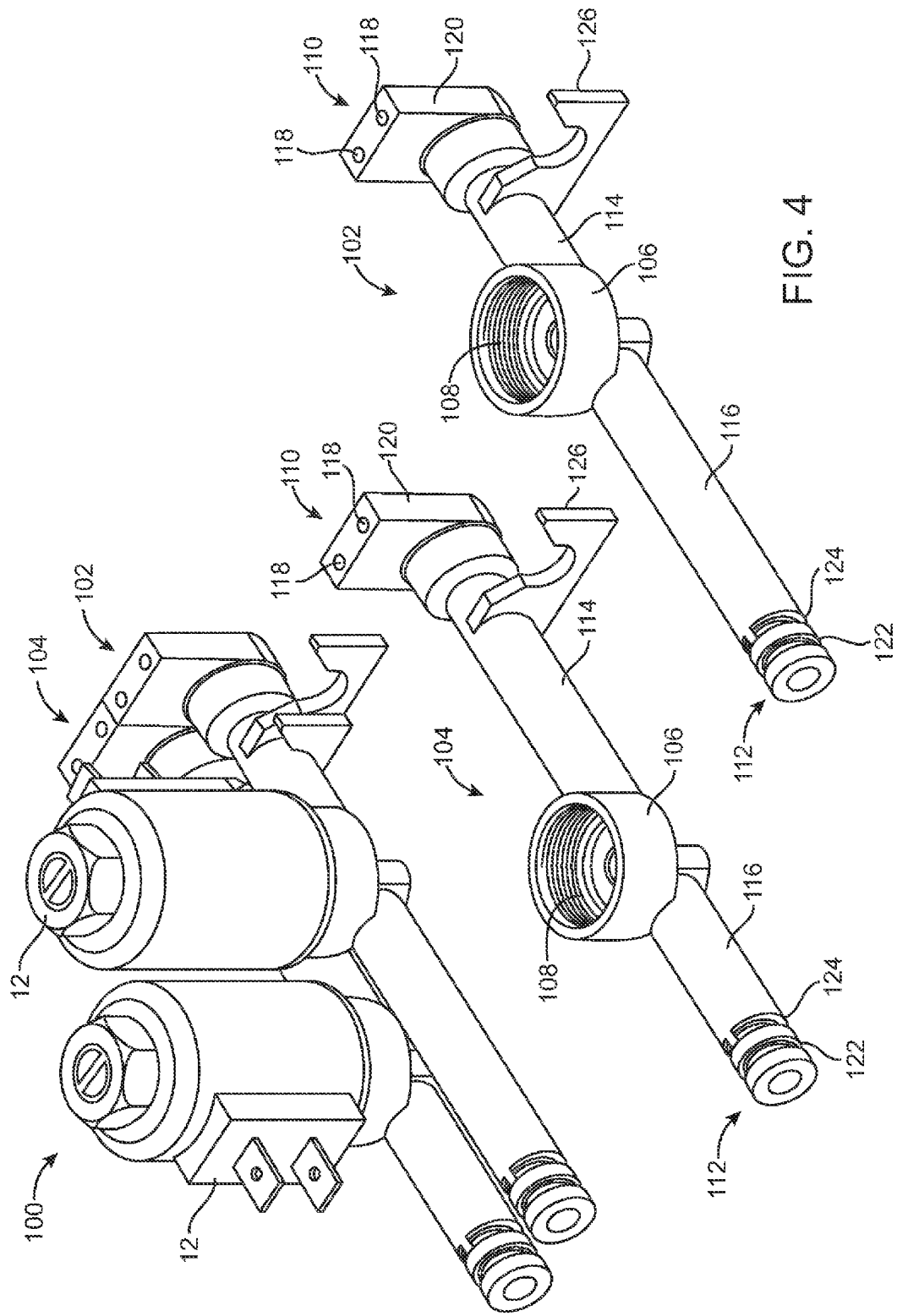
FIG. 4 is an exemplary diagram showing a modular fitting assembly in accordance with one embodiment of the present invention.

FIG. 4 shows an exemplary diagram showing four modular fittings in accordance with one embodiment of the present invention, two of which have been assembled to form a modular fitting assembly 100 in accordance with one embodiment of the present invention. As shown, the modular fittings shown include two separate configurations, with a first modular fitting 102 having certain features that are offset from their locations of a second modular fitting 104. As shown, FIG. 4 depicts a first modular fitting 102 coupled with a second modular fitting 104 so as to form a modular fitting assembly 100, and also separately depicts a first modular fitting 102 and a second modular fitting 104.

As can be seen in FIG. 4, each modular fitting may be a unitary part that includes a solenoid base 106 with associated solenoid-valve receiving well 108 to receive a solenoid valve 12. Disposed at opposite ends of a modular fitting is a first end 110 and a second end 112. The modular fittings shown include a first conduit 114 that is disposed between the first end 110 and the solenoid base 106, with the first conduit 114 providing a fluid communication path between the solenoid base 106 and the first end 110. Disposed between the second end 112 and the solenoid base 106 is a second conduit 116, with the second conduit 116 also providing a fluid communication path. The first end 110 is adapted to be coupled with a first fluid line male connection fitting (not shown). The first end 110 further includes apertures 118 adapted to receive U-shaped retaining pins (not shown), which interface with recesses located in the first fluid line male connection fitting, thereby providing a retention means between the first end and the male connection fitting. Additionally, the first end 110 further includes an interface surface 120, which is adapted to interface with an interface surface 120 of an adjacent modular fitting. While the interface surface 120 shown is flat, other complementary shaped surfaces or shapes may also be used. The second end is adapted to couple with a second fluid line female connection fitting (not shown). The first fluid line may be the upstream supply line and the second fluid line may be the discharge line. Alternatively, the first fluid line may be the downstream discharge line and the second fluid line may be the upstream supply line. The second end 112 includes a circumferential recess 122 adapted to receive an o-ring seal, and a retaining-pin recess 124 adapted to receive a retaining pin, such as a U-shaped retaining pin, thereby providing a retention mechanism between the second end 112 and the second fluid line female connection fitting.

The modular fittings shown also include a coupling feature 126 adapted to couple adjacent modular fittings. As shown, the coupling feature 126 may come in the form of a connecting clip that is shaped to receive a complementary-shaped conduit of an adjacent modular fitting. As shown, the connecting clips of adjacent modular fittings are offset so as to allow the formation of a modular fitting assembly 100 for a desired number of fluid circuits from two basic modular fitting configurations. In addition, the solenoid-valve receiving wells 108 of adjacent modular fittings are likewise offset in an alternating pattern so as to provide a more compact resulting modular fitting assembly 100, as shown in FIG. 4.

Figure 5:
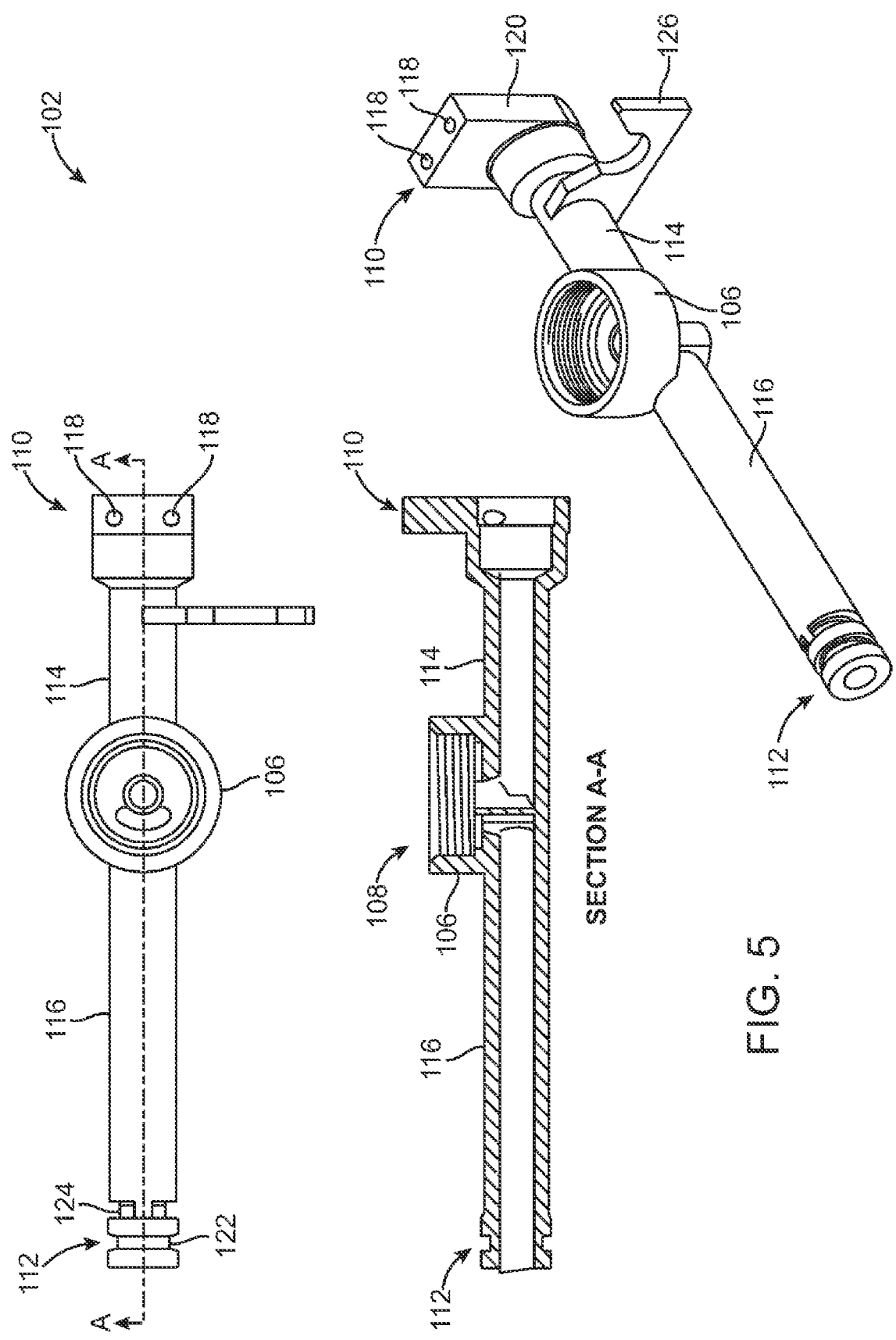
FIG. 5 is an exemplary diagram showing various details of a modular solenoid-valve fitting assembly of FIG. 4.

FIG. 5 shows an exemplary diagram showing various details of the first modular fitting 102 configuration of FIG. 4. In the illustrated configuration, the solenoid-valve receiving well 108 and the connecting clip are positioned closer to the first end 110 of the first modular fitting 102 compared to where these features are located on the second modular fitting 104 of FIG. 4. At the second end 112, the modular fitting includes a circumferential recess 122 for receiving an o-ring seal, and a retaining-pin recess 124 adapted to receive a retaining pin, such as the U-shaped pin discussed above. As such, the first modular fitting 102 shown, and the second modular fitting 104, are configured to couple with the male end of a first fluid line (not shown), as well as couple with the female end of a second fluid line (not shown), thereby providing the ability to splice the modular fitting into an existing supply line at an existing junction of the supply line, where the existing junction includes a male fitting coupled to a female fitting. The first modular fitting 102 shown, and the second modular fitting 104 further include a first conduit 114 and a second conduit 116 that provide a path for the fluid to flow between an attached solenoid valve 12 (not shown) and the first end 110 and second end 112 respectively. As can be seen in Section A-A of FIG. 5, the solenoid base 106 is adapted to isolate the fluid in the first conduit 114 from fluid in the second conduit 116 by routing the fluid through an attached solenoid valve 12 (not shown).

Figure 6A:
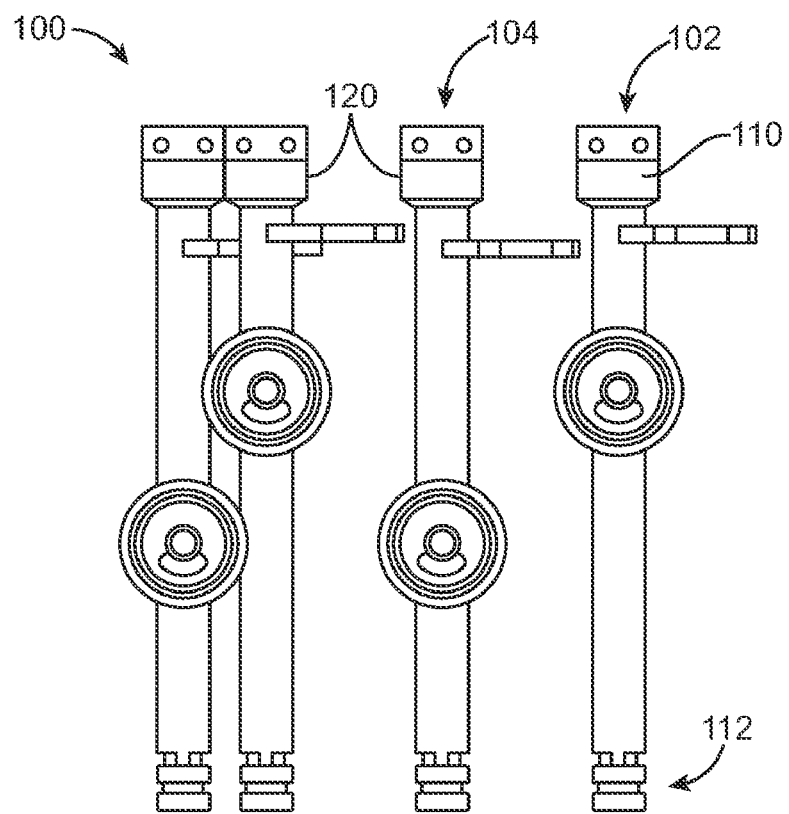
FIGS. 6A and 6B are exemplary diagrams showing various details of the modular fitting assembly of FIG. 4.
Figure 6B:
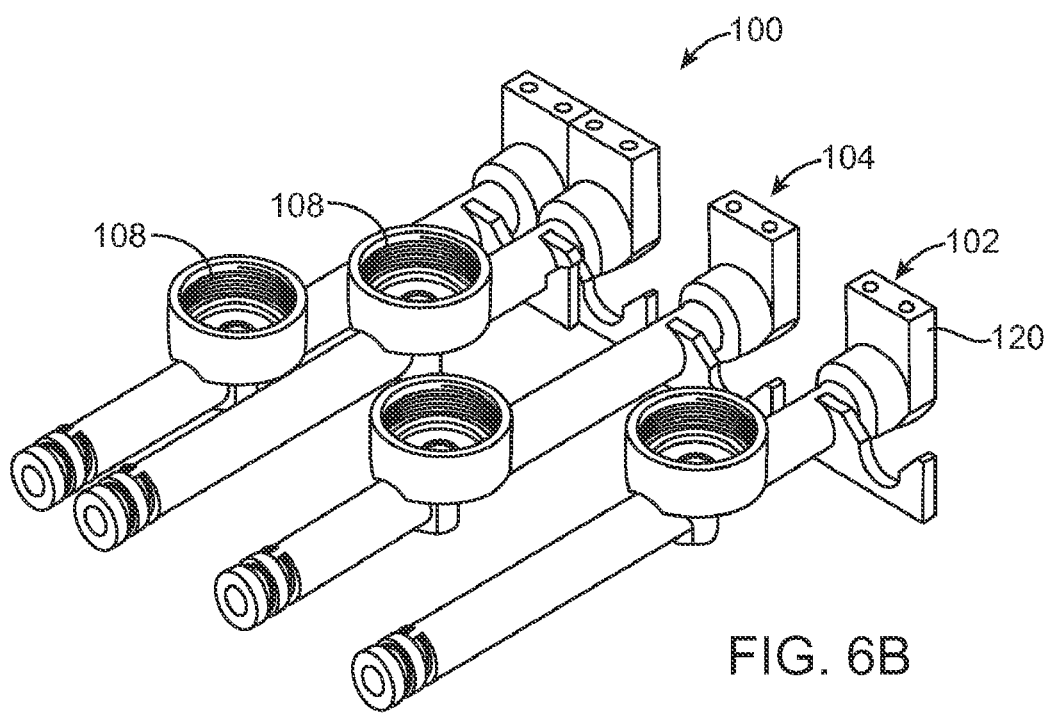

FIGS. 6A and 6B provide additional views of the modular fittings 102 and 104 and modular fitting assembly 100 of FIG. 4, without the two solenoid valves shown in FIG. 4. FIG. 6A contains a plan view and a side view of the four modular fittings of FIG. 4, where the leftmost two fittings in the plan view are shown in an assembled state, and the rightmost two fittings in the plan view are shown in an adjacent unassembled state. As can be seen in the combination of the leftmost two fittings in the plan view, the modular fittings of this embodiment are configured with offset solenoid-valve receiving wells 108 and offset connecting clips so as to allow a more compact resulting modular fitting assembly 100. As shown in FIGS. 6A and 6B, the connecting clip of the first modular fitting is in reception of a conduit section of the second modular fitting, and the connecting clip of the first modular fitting 102 is offset from the connecting clip of the second modular fitting 104 by a distance equal to the thickness of the connecting clips. Although greater offset distances may be used, when the connecting clips are offset by the thickness of the connecting clips, the resulting modular fitting assembly 100 has additional mating surfaces between adjacent modular fittings due to the areas where the connecting clips are in contact with each other. These additional mating surfaces provide additional rigidity between adjacently located modular fittings in the modular fitting assembly 100. Additionally, as discussed above, the first end 110 of the modular fittings have an interface surface 120 that is designed to interface with a corresponding interface surface 120 on an adjacent fitting, thereby providing additional rigidity to the resulting modular fitting assembly 100.

Figure 7:
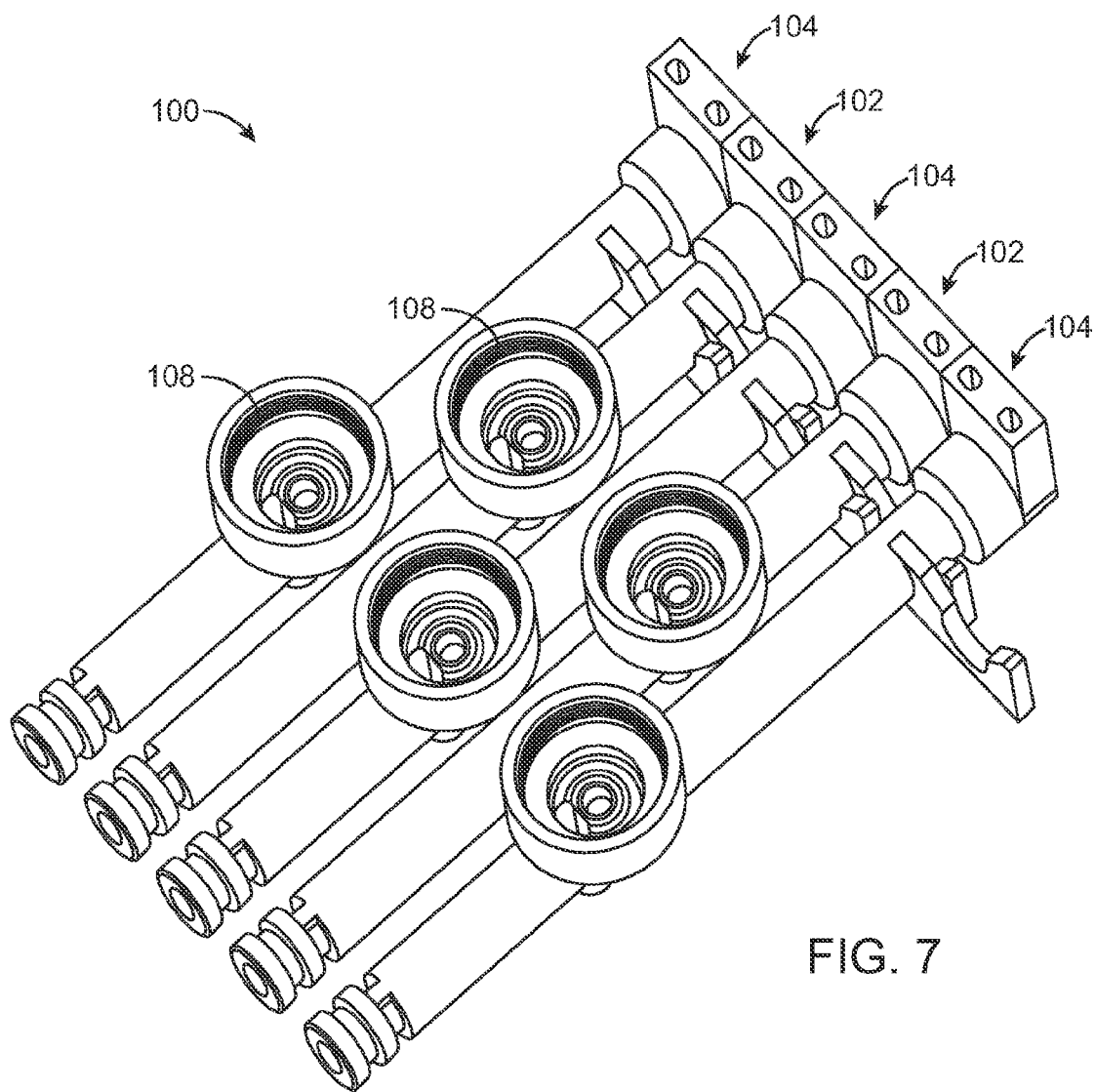
FIG. 7 is an exemplary diagram showing a modular fitting assembly that includes five modular fitting assemblies.

FIG. 7 shows an exemplary diagram showing a modular fitting assembly 100 made up of five modular fittings in accordance with an embodiment of the present invention. As shown in FIG. 7, the connecting clips of the modular fittings are shaped to engage an adjacent and complementarily-shaped conduit section of an adjacent modular fitting, as well as to interface with surfaces of the connecting clips of the adjacent modular fittings. Additionally, FIG. 7 further illustrates the alternately offset solenoid-valve receiving wells 108 of the first modular fittings 102 and second modular fittings 104, as well as the contacting interface surfaces 120 at the first end 110 of adjacent modular fittings.

Figure 8:
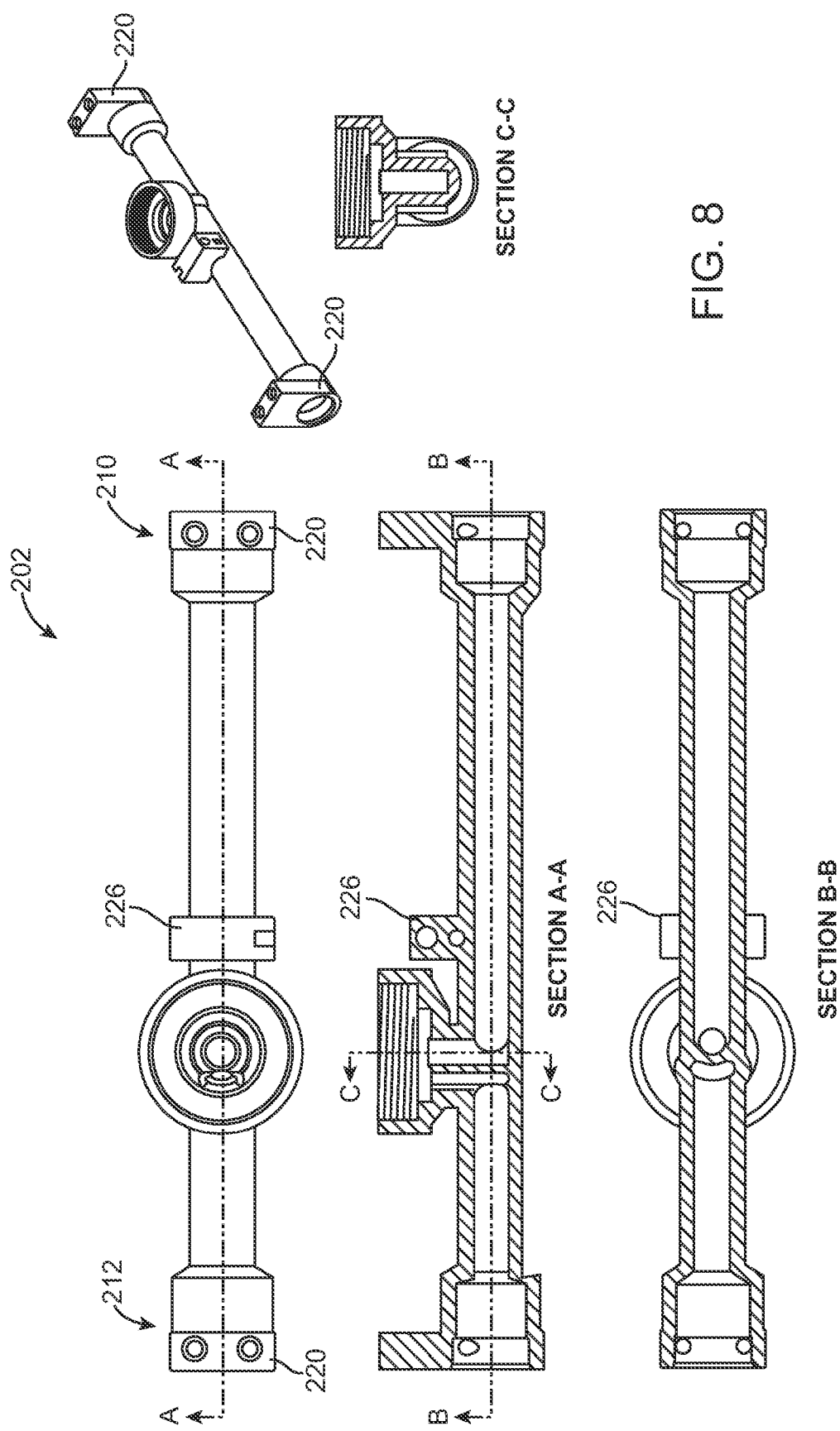
FIG. 8 is an exemplary diagram showing a modular fitting assembly in accordance with another embodiment of the present invention.

FIG. 8 illustrates another embodiment of a modular fitting 202 in accordance with the present invention. In the embodiment shown, a coupling feature 226 is provided that is adapted to interface with a complementary shaped coupling feature of an adjacent modular fitting. In the embodiment shown, the coupling feature 226 is disposed approximately midway between the first end 210 and the second end 212 of the modular fitting 202. Further, the embodiment of FIG. 8 includes a first end 210 and a second end 212 that are configured like the first end 110 of the embodiment of FIG. 4, which was discussed above. As can be appreciated, the embodiment of FIG. 8 provides for three interfacing regions between adjacent modular fittings, which are provided by the interface surfaces 220 located at both the first end 210 and the second end 212 and by the centrally located coupling feature 226, thereby providing a high level of rigidity between adjoining modular fittings in a resulting modular fitting assembly 200.

As will be understood by those skilled in the art, the present invention may be embodied in other specific forms without departing from the essential characteristics thereof. These other embodiments are intended to be included within the scope of the present invention, which is set forth in the following claims.

What is claimed is:

1. A modular fitting for use with a first solenoid valve to control a fluid flow in a beverage dispensing system, the modular fitting comprising:
   a first end adapted to couple with a first fluid line;
   a first conduit in fluid communication with the first end;
   a second end adapted to couple with a second fluid line;
   a first solenoid base adapted to receive the first solenoid valve, the first solenoid base adapted to place a first side of the first solenoid valve in fluid communication with the first conduit and to place a second side of the first solenoid valve in fluid communication with the second end;
   a first interface surface adapted to interface with a second interface surface of a second modular fitting; and
   a coupling feature extending from a side of the first conduit and adapted to interface with the second modular fitting, the coupling feature being offset from the first interface surface along an elongate direction of the modular fitting, wherein each of the modular fitting and the second modular fitting is monolithically formed, the second modular fitting including
      a third end adapted to couple with a third fluid line;
      a third conduit in fluid communication with the third end;
      a fourth end adapted to couple with a fourth fluid line; and
      a second solenoid base adapted to receive a second solenoid valve, the second solenoid base adapted to place a first side of the second solenoid valve in fluid communication with the third conduit and to place a second side of the second solenoid valve in fluid communication with the fourth end.

2. The modular fitting of claim 1, further comprising:
a second conduit coupled with the second end and the first solenoid base, the second end being in fluid communication with the first solenoid base through the second conduit.

3. The modular fitting of claim 1, wherein the coupling feature includes a connecting clip that defines an open-ended receptacle shaped to receive and interface with a complementary-shaped conduit of the second modular fitting, the connecting clip extending transverse to the first conduit.

4. The modular fitting of claim 3, wherein the connecting clip is offset from a second connecting clip of the second unitary modular fitting by a distance equal to a thickness of the connecting clip.

5. The modular fitting of claim 1, wherein the coupling feature is adapted to engage a complementary-shaped feature of the second modular fitting.

6. The modular fitting of claim 1, wherein the first solenoid base and the second solenoid base are disposed at different distances from the first end and the third end, respectively.

7. The modular fitting of claim 1, wherein the second end is adapted to detachably couple with a second fluid line female fitting, and the first end is adapted to detachably couple with a first fluid line fitting.

8. The modular fitting of claim 7, wherein the second end includes a recess adapted to receive an o-ring seal and a recess adapted to receive a retaining pin, and the first end is adapted to receive a retaining pin.

9. The modular fitting of claim 1, wherein the first end is adapted to detachably couple with a first fluid line female fitting, and the second end is adapted to detachably couple with a second fluid line fitting.

10. The modular fitting of claim 9, wherein the first end includes a recess adapted to receive an o-ring seal and a recess adapted to receive a retaining pin, and the second end is adapted to receive a retaining pin.

11. The modular fitting of claim 1, wherein the first solenoid base includes a threaded well adapted to receive the first solenoid valve.

12. The modular fitting of claim 1, further comprising a third interface surface adapted to interface with a third modular fitting, the third interface surface being disposed on an opposite side of the modular fitting relative to the first interface surface, each of the first and third interface surfaces being planar, the first and third interface surfaces being parallel to each other.

13. A modular fitting assembly for use with a first solenoid control valve and a second control valve to control fluid flows in a beverage dispensing system, the modular fitting assembly comprising:
a first modular fitting that is monolithically formed, the first modular fitting including
a first end adapted to couple with a first fluid line;
a first conduit in fluid communication with the first end;
a second end adapted to couple with a second fluid line;
a first solenoid base adapted to receive the first solenoid valve, the first solenoid base adapted to place a first side of the first solenoid valve in fluid communication with the first conduit and to place a second side of the first solenoid valve in fluid communication with the second end;
a first interface surface adapted to interface with a second interface surface of a second modular fitting, the second modular fitting being monolithically formed; and
a first coupling feature extending from a side of the first conduit and interfacing with the second modular fitting, the coupling feature being offset from the first interface surface along an elongate direction of the modular fitting; and
the second modular fitting including
a third end adapted to couple with a third fluid line;
a third conduit in fluid communication with the third end;
a fourth end adapted to couple with a fourth fluid line;
a second solenoid base adapted to receive the second solenoid valve, the second solenoid base adapted to place a first side of the second solenoid valve in fluid communication with the third conduit and to place a second side of the second solenoid valve in fluid communication with the fourth end.

14. The modular fitting assembly of claim 13, wherein the first solenoid base and the second solenoid base are disposed at different distances from the first end and the third end, respectively.

15. The modular fitting assembly of claim 13, wherein the first coupling feature includes a connecting clip that defines an open-ended receptacle shaped to receive and interface with a complementary-shaped conduit of the second modular fitting, the connecting clip extending transverse to the first conduit.

16. The modular fitting assembly of claim 15, wherein the second modular fitting further includes a second connecting clip, the second connecting clip defining an open-ended receptacle shaped to receive and interface with a complementary-shaped conduit of a third modular fitting, the second connecting clip extending transverse to the third conduit, the first and second connecting clips being disposed at different distances from the first and third ends, respectively.

17. The modular fitting assembly of claim 16, wherein the connecting clip has a side surface that interfaces with a side surface of the second connecting clip.

18. The modular fitting assembly of claim 13, wherein the first coupling feature is adapted to engage a complementary-shaped feature of the second modular fitting.

19. The modular fitting assembly of claim 13, wherein each of the first and second solenoid bases includes a threaded well adapted to receive the first solenoid valve and the second solenoid valve, respectively.

20. The modular fitting assembly of claim 13, wherein each of the first end, the second end, the third end, and the fourth end is further adapted to be coupled with the first fluid line, the second fluid line, the third fluid line, and the fourth fluid line, respectively, using one or more retaining pins.

* * * * *